Figure 1:
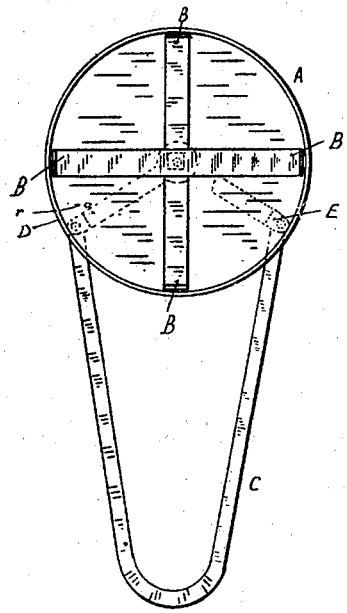

No. 708,987. Patented Sept. 16, 1902.
E. C. BAUGHMAN.
ICE CREAM DIPPER.
(Application filed Feb. 26, 1902.)

(No Model.) 2 Sheets—Sheet 1.

Witnesses
J. T. Fisher
C. E. Curry

Inventor
Edson C. Baughman
By J. A. Rosen Atty.

THE NORRIS PETERS CO., PHOTO-LITHO., WASHINGTON, D. C.

No. 708,987. Patented Sept. 16, 1902.
E. C. BAUGHMAN.
ICE CREAM DIPPER.
(Application filed Feb. 26, 1902.)

(No Model.) 2 Sheets—Sheet 2.

Witnesses
J. T. Fisher
C. E. Curry

Inventor
Edson C. Baughman
By
J. A. Rosen
Atty

THE NORRIS PETERS CO., PHOTO-LITHO., WASHINGTON, D. C.

UNITED STATES PATENT OFFICE.

EDSON C. BAUGHMAN, OF TOPEKA, KANSAS.

ICE-CREAM DIPPER.

SPECIFICATION forming part of Letters Patent No. 708,987, dated September 16, 1902.

Application filed February 26, 1902. Serial No. 95,766. (No model.)

*To all whom it may concern:*

Be it known that I, EDSON C. BAUGHMAN, a citizen of the United States of America, residing at Topeka, in the county of Shawnee and State of Kansas, have invented new and useful Improvements in Ice-Cream Dippers, of which the following is a specification.

My invention relates to that class of dippers which consist of a bowl, rib-like arms fitting against the bottom and sides thereof, an outside frame or arm to which said arms are attached, and a spring-handle for rotating the bowl and said rib-like arms in opposite directions. While dippers of this class may be used for any thick, sticky, or pasty substances, usually they are adapted for the handling of ice-cream, ices, and similar frozen confections. In my present device I do away with some parts which have been adapted to collect dirt, rust, and other impurities which vitiate the ice-cream, and I so construct the dipper that it may be readily taken apart for cleaning or other purposes. I accomplish this by means of a bolt extending through a perforation in the bottom of the bowl and detachably connecting said rib-like arms to the outside frame or arm. I also so construct my present device by extending the outside arms downwardly, so that the bowl filled with the ice-cream may be thrust down into a mold adapted to receive it and the ice-cream discharged therein in layers without marring the form of the same, making what is called "Metropolitan" ice-cream—that is, ice-cream consisting of layers of different colors or flavors.

My device will more particularly be explained hereinafter and may be seen in the drawings accompanying and made a part hereof, in which—

Figure 2:
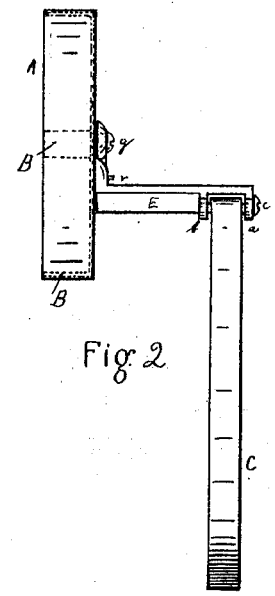
Figure 3:
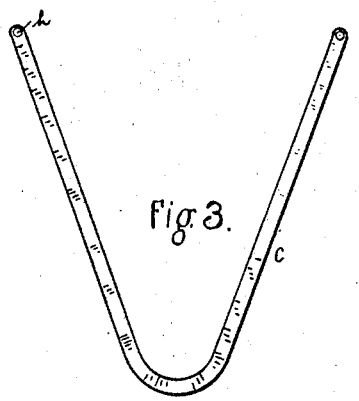
Figure 4:
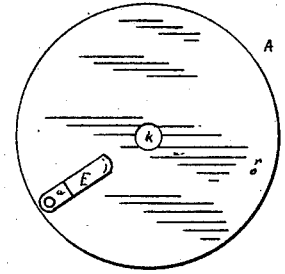
Figure 5:
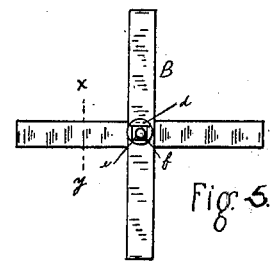
Figure 6:
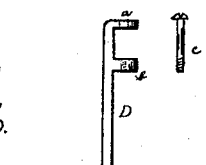
Figure 7:
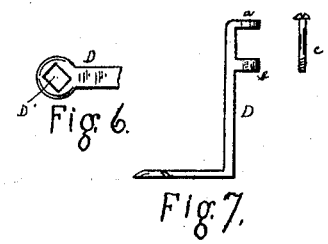
Figure 8:
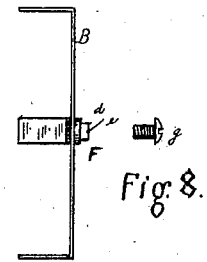
Figure 9:
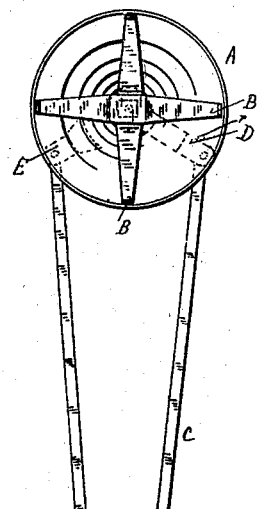
Figure 11:
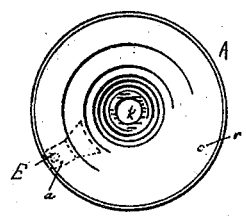
Figure 10:
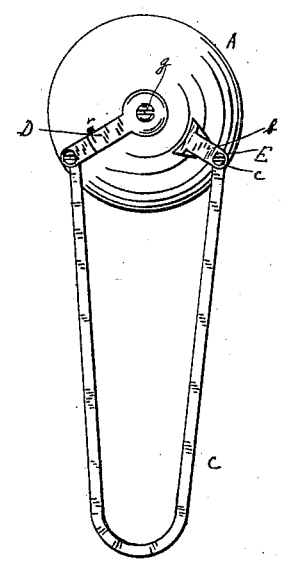
Figure 12:
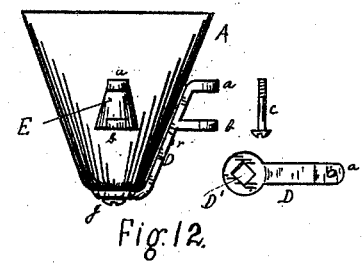
Figure 14:
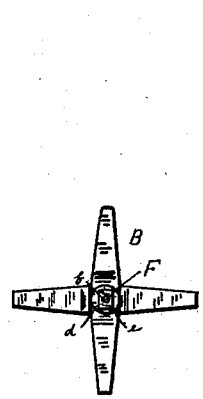
Figure 13:
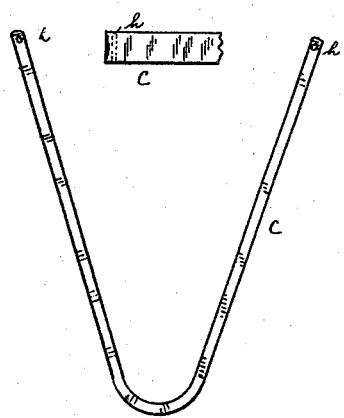
Figure 15:
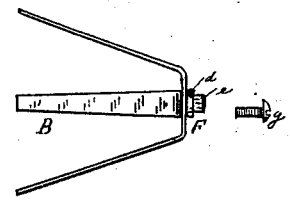

Figure 1 is a top view, and Fig. 2 a side view, of the dipper. Fig. 3 is a view of the spring-handle detached. Fig. 4 is a bottom view of the bowl detached. Fig. 5 is a bottom view of the rib-like arms or cutters, scrapers, &c., as they are variously designated. Fig. 6 is a partial bottom view of the outside frame or arm D, of which Fig. 7 is a side view. Fig. 8 is a side view through the line $x\ y$, Fig. 5, of the rib-like arms. Figs. 9 to 15, inclusive, represent another form of the dipper. Figs. 9 and 10 are respectively top and bottom views. Fig. 11 is a top view of the bowl detached. Fig. 12 is a side view of the dipper, the spring-handle C being detached therefrom and giving a top view of the outside frame or arm detached. Fig. 13 is a top and partial side view of the spring-handle. Fig. 14 is a bottom view, and Fig. 15 a side view, of the rib-like arms detached.

Like letters refer to like parts throughout the several views.

A is the bowl of the dipper.

B B are rib-like arms fitting against the bottom and sides of the bowl A and are attached to the outside frame or arm D through the perforation $k$ in the bottom of the bowl A by means of the bolt F, which is an integral part of or fixedly attached to said rib-like arms. Said bolt F has a circular portion $d$, which extends through the perforation $k$, and an angular portion $e$, which extends through the correspondingly angular perforation D' in the frame or arm D, being detachably held in place therein by the screw $g$, which is screwed into the threaded hole $f$. To the other or protruding end of the frame or arm D is connected one arm of the spring-handle C by means of the two arms $a\ b$ and bolt $c$. In like manner the other arm of said spring-handle is attached to the arm E, which is an integral part of or fixedly attached to the bowl A. The two arms D and E extend radially from the center of said bowl at an angle of about ninety degrees, allowance being made for the number and width of the rib-like arms and the interference of said outside arms with each other. Normally the arms are sprung outwardly by said spring-handle, but are prevented from being sprung beyond the desired point by the stop or pin $r$. As the two arms of the spring-handle are pressed together the bowl and rib-like arms will rotate in opposite directions. Each rib-like arm will be caused to pass around one-fourth of the perimeter of the bowl. All of them will pass over the entire bottom and sides thereof. This operation frees or cuts the ice-cream from the bottom and sides of the dipper, whence it will drop of its own weight when the dipper is inverted. In using the dipper with the mold the ice-cream in the dipper is smoothed down even with the top edges thereof before being discharged therefrom. In case it is not desired to use this form of dipper with the mold the bowl A may be of conical formation and the outside frame or arm D may extend upwardly along and the arm E may be attached to the side of the bowl, as shown in Figs. 9 to 15, inclusive, although this form of dipper may be used with a shallow mold. If desired to use the dipper with the mold, the bowl A has a flat bottom and sides substantially at right angles thereto, and the arms D and E extend downwardly from the bottom of the dipper, as shown in Figs. 1, 2, 4, and 7, so that the bowl A may be thrust down into the mold G before operating the rib-like arms.

I am aware, of course, that dippers have heretofore been constructed which consist of the combination of a bowl, rib-like arms fitting against the bottom and sides thereof, an outside frame to which said arms are attached, and a spring-handle for rotating the bowl and arms in opposite directions, and therefore I do not claim the same, broadly.

What I do claim as new, and desire to secure by Letters Patent, is—

An ice-cream dipper for forming Metropolitan ice-cream, consisting of the combination of a bowl having a perforated bottom, rib-like arms fitting against the bottom and sides thereof, an outside arm to which said rib-like arms are attached through said perforation, another arm projecting from said bowl, and a spring-handle connected to said arms respectively and adapted to rotate said bowl and said rib-like arms in opposite directions.

In testimony whereof I have affixed my signature in presence of two witnesses.

EDSON C. BAUGHMAN.

Witnesses:
JOSEPH GROLL,
C. J. ROSEN.